(12) United States Patent
Li et al.

(10) Patent No.: US 11,386,136 B2
(45) Date of Patent: Jul. 12, 2022

(54) AUTOMATIC CONSTRUCTION METHOD OF SOFTWARE BUG KNOWLEDGE GRAPH

(71) Applicant: Yangzhou University, Jiangsu (CN)

(72) Inventors: Bin Li, Jiangsu (CN); Dingshan Chen, Jiangsu (CN); Xiaobing Sun, Jiangsu (CN)

(73) Assignee: Yangzhou University, Jiangsu (CN)

( * ) Notice: Subject to any disclaimer, the term of this patent is extended or adjusted under 35 U.S.C. 154(b) by 341 days.

(21) Appl. No.: 16/641,414

(22) PCT Filed: Sep. 5, 2018

(86) PCT No.: PCT/CN2018/104155
§ 371 (c)(1),
(2) Date: Feb. 24, 2020

(87) PCT Pub. No.: WO2019/137033
PCT Pub. Date: Jul. 18, 2019

(65) Prior Publication Data
US 2020/0257717 A1 Aug. 13, 2020

(30) Foreign Application Priority Data
Jan. 12, 2018 (CN) .......................... 201810047681.5

(51) Int. Cl.
*G06F 16/36* (2019.01)
*G06N 20/00* (2019.01)
(Continued)

(52) U.S. Cl.
CPC ............ *G06F 16/367* (2019.01); *G06F 8/427* (2013.01); *G06F 11/3624* (2013.01);
(Continued)

(58) Field of Classification Search
CPC ........ G06F 16/367; G06F 8/427; G06N 20/00
See application file for complete search history.

(56) References Cited

U.S. PATENT DOCUMENTS

| | | | |
|---|---|---|---|
| 2009/0240569 A1* | 9/2009 | Ramer ................ | G06F 16/9577 |
| | | | 707/999.01 |
| 2015/0095303 A1 | 4/2015 | Sonmez et al. | |

(Continued)

FOREIGN PATENT DOCUMENTS

| | | |
|---|---|---|
| CN | 105608232 | 5/2016 |
| CN | 105760495 | 7/2016 |

(Continued)

*Primary Examiner* — Eliyah S. Harper
(74) *Attorney, Agent, or Firm* — Simpson & Simpson, PLLC

(57) ABSTRACT

Provided is an automatic construction method of a software bug knowledge graph. The method includes extraction of a relationship triple of a bug and domain classification of the bug. Specifically, the method includes: collecting bug information in a bug library and processing bug description information, obtaining a verb phrase and a noun phrase in a description sentence by means of natural language processing, and then obtaining a relationship triple of the bug according to a dependency relationship between words related to the bug information, extracting a domain feature of the bug, performing learning and training with a semi-supervised classifier to enable the classifier automatically to classify unlabeled triples, storing all the classified relationship triples in a graph database, and thus constructing a software bug knowledge graph.

1 Claim, 3 Drawing Sheets

(51) Int. Cl.
  *G06F 40/253*    (2020.01)
  *G06F 40/211*    (2020.01)
  *G06F 40/289*    (2020.01)
  *G06F 8/41*      (2018.01)
  *G06F 11/36*     (2006.01)

(52) U.S. Cl.
  CPC .......... *G06F 40/211* (2020.01); *G06F 40/253* (2020.01); *G06F 40/289* (2020.01); *G06N 20/00* (2019.01)

(56) References Cited

U.S. PATENT DOCUMENTS

| | | | |
|---|---|---|---|
| 2016/0210602 A1* | 7/2016 | Siddique | G06Q 20/384 |
| 2018/0239751 A1* | 8/2018 | Durr | G06N 20/00 |
| 2018/0307904 A1* | 10/2018 | Patil | G06K 9/628 |
| 2018/0336362 A1* | 11/2018 | Guttmann | G06N 5/04 |
| 2019/0205794 A1* | 7/2019 | Hsu | G06N 5/022 |

FOREIGN PATENT DOCUMENTS

| | | | | |
|---|---|---|---|---|
| CN | 107330125 | | 11/2017 | |
| CN | 108121829 | | 6/2018 | |
| CN | 108121829 A | * | 6/2018 | .......... G06F 11/3624 |

* cited by examiner

Bug 915603
Firefox ignores click on Continue with Mixed Active Content block on GET form submit UNCONFIRMED Unassigned

• Status (UNCONFIRMED bug with no priority)

Product: ▸ Core                           Reported: 4 years ago
    Component: ▸ DOM:Security             Modified: 2 years ago
    Status: UNCONFIRMED

• People (Reporter: Milan Babuskov,Unassigned)

Assignee: ▸ Unassigned              Reporter: Milan Babuskov
                                        Triage Owner: Christoph Kerschbaumer[:ckerschb]
                                        CC: 4 people

• Tracking (Blocks: 1 bug)

Version: 23 Branch                Blocks: MixedContentBlocker
    Target: --
    Platform: x86 Linux
    Points: --

• Firefox Tracking Flags (Not tracked)

This bug is not currently tracked.

•Details (Whiteboard:[domsecurity-backlog])

Whiteboard: [domsecurity-backlog]
    Votes: 0 votes

FIG. 2

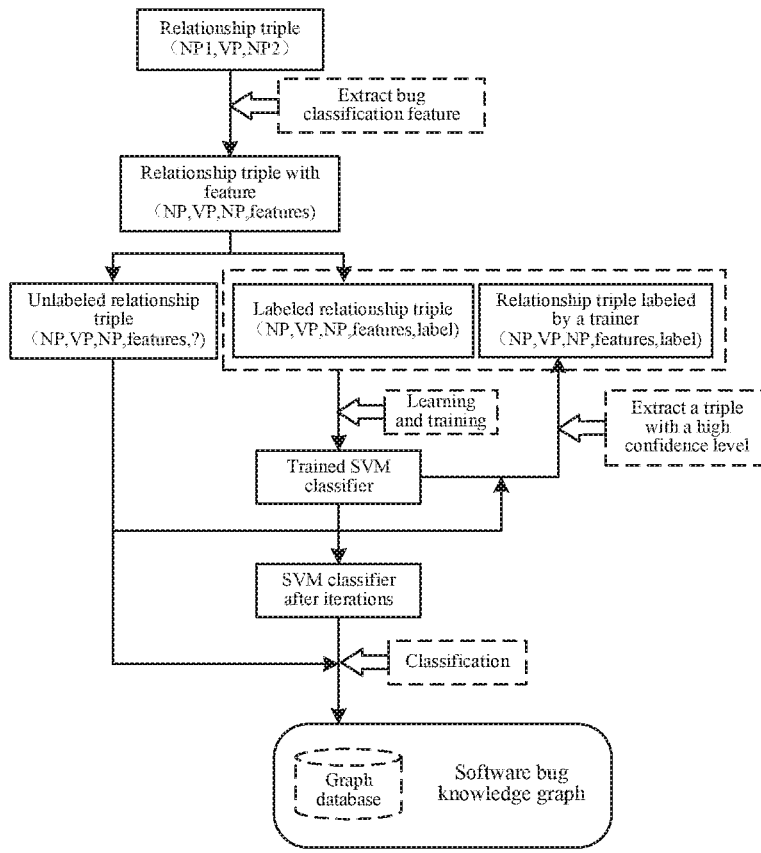

FIG. 3

AUTOMATIC CONSTRUCTION METHOD OF SOFTWARE BUG KNOWLEDGE GRAPH

CROSS-REFERENCE TO RELATED APPLICATIONS

This is a National Stage Application, filed under 35 U.S.C. 371, of International Patent Application No. PCT/CN2018/104155, filed on Sep. 5, 2018, which claims priority to Chinese patent application No. 201810047681.5 filed on Jan. 12, 2018, contents of both of which are incorporated herein by reference in their entireties.

TECHNICAL FIELD

The present disclosure belongs to the field of software maintenance, and particularly relates to an automatic construction method of a software bug knowledge graph.

BACKGROUND

Software developers and maintainers usually need to use some websites such as Bugzilla that contain bug libraries to search for bug related information to solve bug problems they encounter. However, most of these websites adopt a searching method based on the traditional relationship database. Although the search results contain a lot of information and properties of bugs in most cases, the relationship between bugs is not particularly clear. In addition, when a searcher searches by using keywords, the website adopts one-by-one keyword matching, which makes the search results inaccurate; and when the searcher enters fewer or more keywords, two extreme cases will exist: (1) the search results are not only large in number and low in relevance, but also not sorted according to the similarity after matching, which makes the searcher spend a lot of time in browsing and filtering information; (2) the number of returned results is very small or no results are returned, and the information returned is not really relevant. These search results make it difficult for searchers to find the information they really need, which takes much time and effort.

Before the present disclosure, a lot of achievements have been made in the research of knowledge graph at present, some open knowledge graphs are formed, and in particular, the construction of domain-specific knowledge graphs attracts attention of many people. However, the research on the construction of domain-specific knowledge graphs for software bugs is still in the initial stage. In addition, natural language processing is used a lot in the construction of domain-specific knowledge graphs for other domains, but rarely used for the bug domain. The data source of the existing bug library is of high quality. The information of the bugs is processed through natural language, and then the relationship between the bugs is established in the form of a knowledge graph, which can improve the efficiency of software developers and maintainers in solving bugs.

SUMMARY

The present disclosure aims to overcome the above-mentioned defects and develop an automatic construction method of a software bug knowledge graph.

The technical methods of the present disclosure are described below.

The automatic construction method of a software bug knowledge graph includes the following steps.

(1) Bug information in a related bug library is scraped; a BugID, bug description information, and four main properties of platform, product, component and status in a bug report are scraped, and natural language processing is performed on the scraped bug description information, where the natural language processing mainly includes steps of word segmentation and part-of-speech tagging.

(2) A noun phrase (NP), a verb phrase (VP), and a verb phrase with an open clausal complement (VVP) are identified through regular expressions for phrase identification and according to part-of-speech tags of words in a sentence subjected to natural language processing.

(3) Dependency syntax parsing is performed on bug description information to find out a dependency relationship between specific "dependent" and "dominant" words, and a grammatical structure in a bug description sentence is extracted.

(4) A relationship triple, that is, (NP1, VP, NP2), of the bug description information is constructed according to the dependency relationship between words and based on the NP and the VP which are extracted in step (2), where the bug description sentence usually includes more than one relationship triple.

(5) The BugID in the bug information scraped in step (1) is added to supplement the relationship triple of the bug description information extracted in step (4), so as to generate a relationship quadruple, that is, (BugID, NP1, VP, NP2), of a bug.

(6) Property X of the bug collected in step (1) is used to form a property triple of the bug, where the property triple is (BugID, property, X), the property triple is used for further description of the bug information and is prepared for subsequent construction of a software bug knowledge graph.

(7) A domain feature for bug classification is extracted according to the extracted property triple, and the domain feature is used to promote a learning and training process of a classifier in a form of (BugID, NP1, VP, NP2, features).

(8) The learning and training process is performed with a semi-supervised support vector machine (SVM) classifier by using the extracted domain feature, and domain classification is performed for the bug.

(9) After the bug is labeled by the classifier, data of each type of labeled bug is stored in a visual database and the software bug knowledge graph is generated.

The present disclosure has following advantages and effects: bug description is analyzed from the perspective of natural language processing, software maintainers are provided with simpler and more accurate bug information and the most likely domain classification of the bug, which helps software developers and maintainers to more intuitively, quickly, and accurately understand the bug information and the domain knowledge of the bug, and greatly improve efficiency of the software developers and maintainers. The software bug knowledge graph is finally implemented, and an association relationship between bugs is established. When the searcher searches for related bug information, other bug information related to the bug is provided, and thereby the search efficiency is greatly improved.

The method also has the following advantages.

(1) In the method, the relationship triple is extracted from the bug description information, which can not only concatenate the relationships between the bugs, but also enable the software maintainer to quickly understand the bug information and the domain knowledge of the bug. When the relationship triple of the bug is extracted, the appropriate word-to-word dependency relationship is selected to make the obtained relationship triple more accurate, and redundancy and noise are reduced.

(2) In the method, according to the description sentence of the bug, the domain feature of the bug is extracted through three steps of feature extraction, feature construction and feature selection.

(3) In the method, a semi-supervised learning classification method is adopted. Through the extracted domain feature of the bug, training and learning are performed on the relationship triple of the bug, and through iterations, the quality of classification is improved and automatic classification of the bug is achieved.

(4) In the method, the data on Bugzilla is analyzed. The quality of the data source is higher, and the data is used to construct a software bug knowledge graph. The graphs helps software developers and maintainers to understand the bug information and the domain knowledge of the bug more intuitively, quickly and accurately, so as to solve the corresponding bug.

At present, the semi-supervised learning classifier is a commonly used classifier learning method, but this semi-supervised mode still requires a small amount of manual labeling, the classification effect is still not ideal, and some triple classification results with redundancy and high noise may be generated. Therefore, before the classifier learning is performed, the classification feature of the bug domain is deliberately extracted by analyzing the related domain knowledge of the bug, helping in the training and learning of the classifier to get a better classifier. The earliest concept of a knowledge graph is a semantic network, and then the philosophy concept "ontology" is introduced into the domain of artificial intelligence to characterize knowledge. Finally, thanks to the development of the web, the knowledge graph is developed rapidly. The knowledge graph is a relationship network obtained by connecting all different kinds of information together, provides the ability to analyze problems from the perspective of "relationships", and is the most effective way to express relationships. The goal of the automatic construction method of the software bug knowledge graph is to analyze the bug description information from a semantic perspective, and automatically classify bugs based on the extracted bug domain features, so as to provide software maintainers with more intuitive bug results. That is, when software developers and maintainers search for the bug problems, keyword searching can be used to give quicker and accurate related information about the bug, as well as association of the bug with other bugs and domain knowledge.

BRIEF DESCRIPTION OF DRAWINGS

FIG. 2 is a screenshot of report information of bug915603 of the present disclosure;

FIG. 3 is a schematic diagram of a classification training and learning process of an SVM classifier of the present disclosure.

DETAILED DESCRIPTION

The technical idea of the present disclosure is described below.

The method mainly includes two parts. Firstly, the first part is the extraction of the relationship triple of a bug; secondly, a part is the domain classification of the bug. Specifically, firstly the bug-related information in the bug library is collected and the processing is focused on the description information of the bug. Verb phrases and noun phrases of the description sentence are obtained through the natural language processing technique, and then according to the dependency relationship between the words related to the bug information, the relationship triple of the bug is obtained. One or more domain features of the bug are extracted, and a semi-supervised classifier is subjected to training and learning to finally make the classifier automatically classify unlabeled triples. Then, all the classified relationship triples are stored in a graph database to construct the software bug knowledge graph.

In the present disclosure, the existing high-quality structured data is used and the software bug domain is focused on to carry out the following work from the perspectives of natural language processing, bug domain feature extraction, and automatic domain classification.

The present disclosure is explained in detail below.

Figure 1:
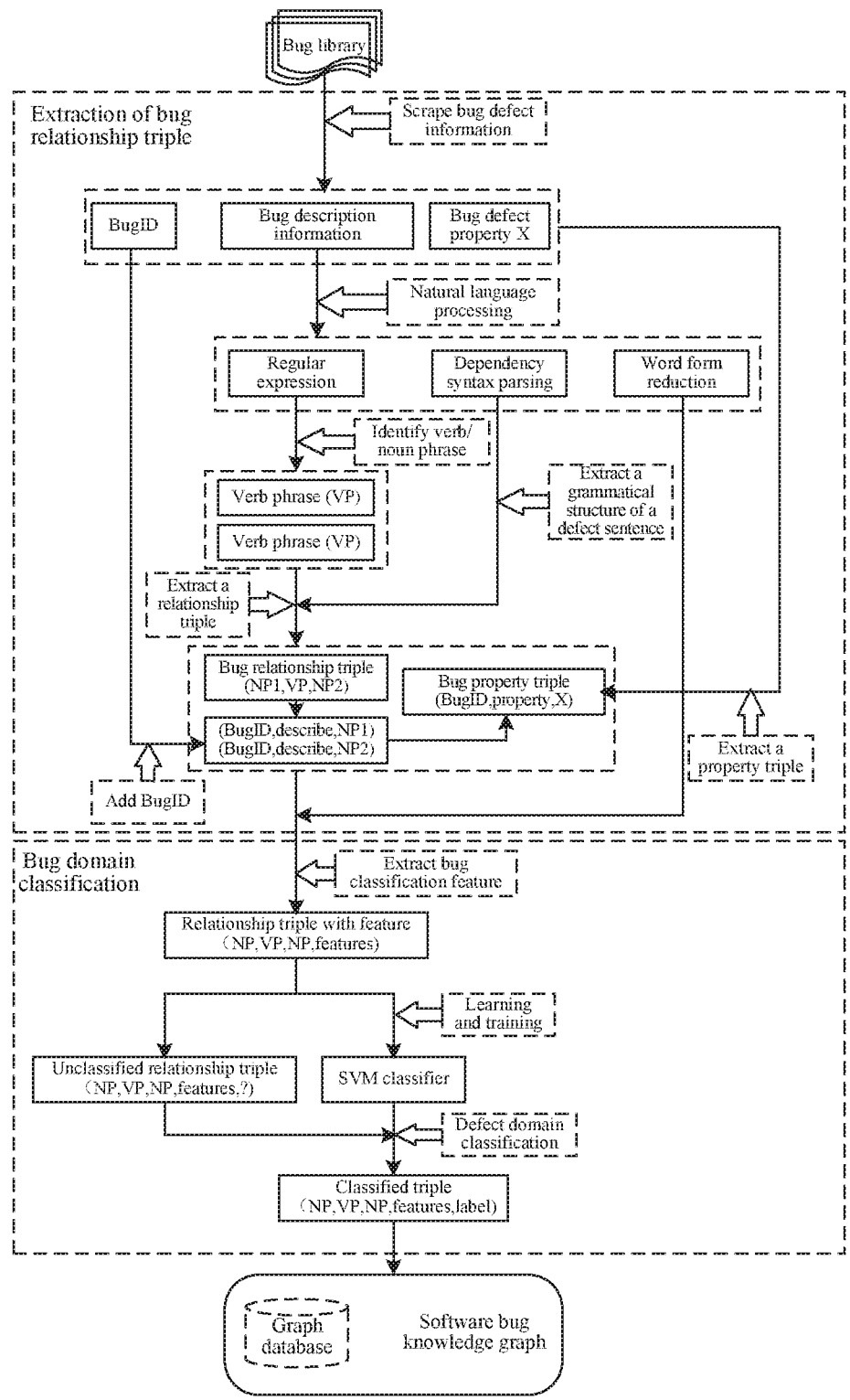
FIG. 1 is a schematic flowchart of the present disclosure.

As shown in FIG. 1, the process includes the steps described below.

In step (1), structuration processing is performed on a bug report (an information table of historically submitted bug reports as shown in Table 1, which records the historically submitted bugs and property information thereof) collected in a bug library. The information such as BugID, bug description information, platform, product, component and status is extracted and saved in the required file format for processing the data later. The natural language processing technology is used. Here the Stanford coreNLP tool is used, and the processing includes steps of word segmentation and part-of-speech tagging.

TABLE 1

Example of bug data

| Bug ID | Bug description information | Status | Product | Component |
| --- | --- | --- | --- | --- |
| 915603 | Firefox ignores click on Continue button with Mixed Active Content block on GET form submit | UNCO | Core | DOM: Security |
| 944414 | xul <browser> element should not care for x-frame-options | UNCO | Core | DOM: Security |
| 1025582 | CORS request intermittently fails after refreshing page rapidly | UNCO | Core | DOM: Security |
| 1112889 | Firefox reports a CSP violation when using the "onload" attribute on a div | UNCO | Core | DOM: Security |
| 1221047 | Version 41.0.2 on Win requires Access-Control-Allow-Origin for the same domain | UNCO | Core | DOM: Security |
| 1422284 | CSP upgrade insecure requests follow through to new (insecured) domains | UNCO | Core | DOM: Security |
| 1423974 | Referrer-Policy is not respected inside iframes | UNCO | Core | DOM: Security |
| 1330795 | Basic HTTP auth fails on Linksys WRT120N-Upgrade-Insecure-Requests related? | UNCO | Core | DOM: Security |

TABLE 1-continued

Example of bug data

| Bug ID | Bug description information | Status | Product | Component |
|---|---|---|---|---|
| 1329198 | Issue with Google Chrome CSP evaluation of child-src | UNCO | Core | DOM: Security |
| 1343950 | Content Security Policy (CSP) implement unsafe-hashed-attributes | UNCO | Core | DOM: Security |

In step (2), the verb phrases (VP) and noun phrases (NP) in the description sentence of the bug are extracted. Here the verb phrases (VP) and noun phrases (NP) are mainly identified by using the regular expressions in Table 2. In the table, (MD) is a modal verb; and (VB.) represents different types of verbs, for example, VB represents the basic form of a verb, VBG represents the gerund or present participle, VBN represents the past participle of a verb, VBP represents the non-third person singular of a verb, and VBZ represents the third person singular of a verb. (NN.*) represents different types of nouns, for example, NN represents a singular or material noun, NNS represents the noun plural, NNP represents the noun singular, and NNPS represents a plural proper noun; (JJ) represents an adjective; (RB) is an adverb; (DT) represents a definite article; (IN*) represents any preposition or subordinating conjunction; "VVP" is a VP with an open clause; (CC) is a conjunction; and (CD) is a numeral and (TO) is used as a preposition or infinitive label.

TABLE 2

Regular expressions for identification of verb and noun phrases

| Name | Regular expression |
|---|---|
| Noun phrase | (CD)*(DT)?(CD)*(JJ)*(CD)*(VBD|VBG)*(NN.*)* − (POS)*(CD)*(VBD|VBG)*(NN.*)* − (VBD|VBG)*(NN.*)*(POS)*(CD)*(NN.*)* + |
| Verb phrase | (MD)*(VB.*) + (CD)*(JJ)*(RB)*(JJ)*(VB.*)?(DT)? (IN*|TO*) + (MD)*(VB.*) + (JJ)*(RB)*(JJ)*(VB.*)? (DT)?(IN*|TO*) + (MD)*(VB.*) + (JJ)*(RB)*(JJ)*(VB.*) + (MD)*(VB.*) + |
| Noun phrase with a complement | (MD)*(VB.*) + (JJ)*(RB)*(JJ)*(VB.*)?(DT)?(TO*)| + (VB) + (MD)*(VB.*) + (JJ)*(RB)*(JJ)* (VB.*)?(DT)?(IN*) + (VBG) + |

In step (3), dependency syntax parsing is performed on the bug description information. Relationship triples are extracted mainly based on 49 types of dependency relationships defined by grammatical relationships. Table 3 shows the grammatical structure of the sentence "CORS request intermittently fails after refreshing page rapidly." Other major dependency relationships include: csubjpass representing the master-slave passive relationship; npadvmod representing the noun phrase as an adverb modifier; and parataxis representing the parallel relationship.

In step (4), according to the dependency relationship between words, and in combination with the noun phrase (NP) and verb phrase (VP) obtained in step (3), a relationship triple (NP, VP, NP) of the bug description sentence is constructed. A relationship triple (CORS-1, request-2, fails-4) is obtained from nsubj (fails-4, CORS-1) and dobj(fails-4, request-2) in Table 3. The number of relationship triples of each bug description sentence is usually more than one. These triples may be concatenated by the BugID.

TABLE 3

Dependency relationship

| Dependency relationship | Dependent word | Dominant word | Semantic relationship between words |
|---|---|---|---|
| nsubj | fails-4 | CORS-1 | "CORS-1" is nominal subject of "fails-4" |
| xcomp | refreshing-6 | request-2 | "Refreshing-6" is open clausal complement of "Requesr-2" |
| dobj | fails-4, page-7 | request-2, refreshing-6 | "fails-4" is direct object of "request-2"; "page-7" is direct object of "refreshing-6" |
| advmod | Intermittently-3 rapidly-8 | request-2, refreshing-6 | "intermittently-3" is "request-2" adverb modifier "rapidly-8" is "refreshing-6" adverb modifier |

In step (5), the relationship triples of the bug description information extracted in step (4) are concatenated, and the BugID in the bug information scraped in step (1) is added. Finally a quadruple, that is, (BugID, NP, VP, NP) about the bug is thus generated. The main purpose of introducing BugID here is to concatenate multiple relationship triples of the same sentence on one hand and to locate the obtained bug information on the other hand.

In step (6), the property X of the bug scraped in step (1) is extracted, such as the product and component in Table 1, to form a triple (BugID, product, X) as a further supplement to the bug information, and as preparation for the construction of a software bug knowledge graph. A bug has some very important properties to help software maintainers to resolve the bug, so the properties need to be added to the knowledge graph as a relationship of the bug.

In step (7), according to the previously extracted relationship triple, a domain feature for the bug classification is extracted through feature engineering, and thereby the domain feature is used to promote the following training and learning process of the classifier. A form of the extracted domain feature is (BugID, NP1, VP, NP2, features). Table 4 lists the conceptual features in the feature engineering to reflect the quality of the extracted relationship triple. The TF-IDF value is calculated by the following formula (1), for the term frequency (TF) part, $n_{i,j}$ is the number of occurrences of the word $t_i$ in the file $d_j$, and the denominator is a sum of the numbers of occurrences of all words in the file $d_j$. For the inverse document frequency (IDF) part, D is the total amount of bug information, and the denominator $d_j$ is the number of files including the keyword $t_i$.

$$TF-IDF_{weight_{i,j}} = TF * IDF = \frac{n_{i,j}}{\sum_k n_{k,j}} * \log_2\left(\frac{D}{d_{j_i}}\right) \quad (1)$$

TABLE 4

Conceptual feature for classification of bug relationship triples

| Name | Annotation |
|---|---|
| subj_tfidf | tf-idf value of the subject in the bug report in the entire bug library |
| obj_tfidf | tf-idf value of the object in the bug report in the entire bug library |
| sum_tfidf | Sum of tf-idf values of the subject and the object in the entire bug library |

TABLE 4-continued

Conceptual feature for classification of bug relationship triples

| Name | Annotation |
|---|---|
| average_tfidf | The average tf-idf value of the subject and the object in the entire bug library |
| % domain_key_word_subj | Proportion of keywords in the subject in a bug domain |
| % domain_key_word_obj | Proportion of keywords in the object in the bug domain |
| % domain_key_word_suobj | Proportion of keywords in the subject and object in the bug domain |

In step (8), a semi-supervised support vector machine (SVM) classifier is adopted for learning and training by using the extracted bug domain feature to achieve automatic domain classification of the bug. The specific steps are shown in FIG. 3 and include: a part of labeled relationship triples are used as training data to train the classifier subjected to training and learning; then the unlabeled relationship triples are labeled, namely, classified by the trained classifier, and a confidence level is given for each labeling to evaluate the probability that the labeling is correct; then, the labeled relationship triples with a higher confidence level are added to the classifier as new training data to promote the quality of the learning; and finally, the iteration is completed, and unlabeled relationship triples are put into the classifier for labeling. The classes mainly include: 1. function problems (F-Function); 2. interface problems (I-interface); 3. logic problems (L-Logic); 4. computation problems (C-Computation); 5. data problem (A-Assignment); 6. user interface problem (U-User interface); 7. document problem (D-Documentation); 8. performance problem (P-Performance); 9. configuration problem (B-Build, package, merge); 10. standard problem (N-Norms); 11. environmental problem (E-Environments); 12. compatibility problem; 13 other problems (O-Others). Finally (BugID, NP1, VP, NP2, features, label) is formed.

Figure 4:
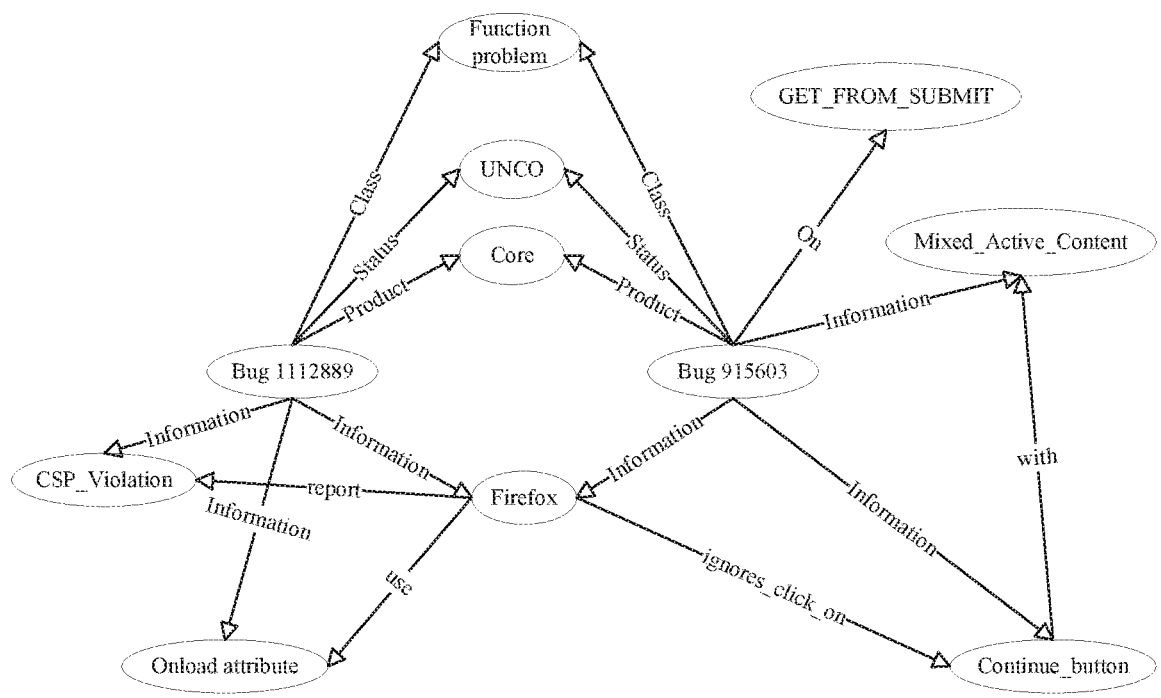
FIG. 4 is an example diagram of a knowledge graph of bug915603 and bug1112889 generated in the present disclosure.

In step (9), after labeling by the classifier is completed, data of each type of labeled bug is stored in a visual graph database to generate the software bug knowledge graph. FIG. 4 is a screenshot of a generated software bug knowledge graph about two bugs including bug915603 and bug1112889. It can be seen from FIG. 4 that these two bugs belong to a same component and product, and have a same status; the domain classes of these two bugs belong to the class of function (F) problem, and through the associated bug description information, the specific content of the bug can be intuitively understood, so that software developers and maintainers can understand the bug information and the domain knowledge thereof more intuitively, quickly and accurately.

What is claimed is:

1. An automatic construction method of a software bug knowledge graph, comprising:
    (1) scraping bug information in a related bug library, scraping a BugID, bug description information, and four main properties of platform, product, component and status in a bug report, and performing natural language processing, wherein the natural language processing mainly comprises steps of word segmentation and part-of-speech tagging;
    (2) identifying a noun phrase (NP), a verb phrase (VP), and a verb phrase with an open clausal complement (VVP) through regular expressions for phrase identification and according to part-of-speech tags of words in a sentence subjected to natural language processing;
    (3) performing dependency syntax parsing on the bug description information to find out a dependency relationship between specific "dependent" and "dominant" words, and extracting a grammatical structure in a bug description sentence;
    (4) constructing a relationship triple of the bug description information according to the dependency relationship between words and based on the NP and the VP extracted in step (2), wherein the constructed relationship triple is (NP1, VP, NP2), the bug description sentence usually comprises more than one relationship triple;
    (5) adding the BugID in the bug information scraped in step (1) to supplement the relationship triple of the bug description information extracted in step (4), so as to generate a relationship quadruple of a bug, wherein the generated relationship quadruple is (BugID, NP1, VP, NP2);
    (6) using property X of the bug collected in step (1) to form a property triple of the bug, wherein the property triple is (BugID, property, X), the property triple is used for further description of the bug information and is prepared for subsequent construction of a software bug knowledge graph;
    (7) extracting a domain feature for bug classification according to the property triple, and using the domain feature to promote a learning and training process of a classifier in a form of (BugID, NP1, VP, NP2, features);
    (8) performing the learning and training process with a semi-supervised support vector machine (SVM) classifier by using the extracted domain feature, and performing domain classification for the bug; and,
    (9) after labeling by the classifier, storing data of the labeled bug of each type in a visual database and generating the software bug knowledge graph.

* * * * *